(12) United States Patent
Van Vugt et al.

(10) Patent No.: US 12,348,057 B2
(45) Date of Patent: Jul. 1, 2025

(54) POWER TRANSMITTER, SYSTEM AND METHOD THEREFOR

(71) Applicant: KONINKLIJKE PHILIPS N.V., Eindhoven (NL)

(72) Inventors: Henricus Antonius Gerardus Van Vugt, Helmond (NL); Pascal Leonard Maria Theodoor Lebens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 501 days.

(21) Appl. No.: 17/637,088

(22) PCT Filed: Aug. 21, 2020

(86) PCT No.: PCT/EP2020/073526
§ 371 (c)(1),
(2) Date: Feb. 22, 2022

(87) PCT Pub. No.: WO2021/037740
PCT Pub. Date: Mar. 4, 2021

(65) Prior Publication Data
US 2022/0294274 A1    Sep. 15, 2022

(30) Foreign Application Priority Data
Aug. 27, 2019    (EP) .................................. 19193803

(51) Int. Cl.
*H02J 50/80*    (2016.01)
*H02J 50/12*    (2016.01)

(52) U.S. Cl.
CPC .............. *H02J 50/80* (2016.02); *H02J 50/12* (2016.02)

(58) Field of Classification Search
CPC .................................. H02J 50/80; H02J 50/12
See application file for complete search history.

(56) References Cited

U.S. PATENT DOCUMENTS 9,633,783 B2 *   4/2017   Lindström ............... H04B 5/72
9,692,260 B2 *   6/2017   Walsh ..................... H02J 50/80
(Continued)

OTHER PUBLICATIONS

International Search Report and Written Opinon From PCT/EP2020/073526 Mailed Oct. 26, 2020.

*Primary Examiner* — Daniel Kessie
*Assistant Examiner* — Brian K Baxter

(57) ABSTRACT

A power transmitter (101) provides wireless power transfer to a power receiver (105) via a wireless inductive power transfer signal. The power transmitter (101) comprises transmitter coil (203) for generating the power transfer signal and a driver (201) generating a drive signal for this. A communicator (207) communicates with the power receiver (105) via a communication channel that does not use the power transfer signal as a communication carrier. A power loop controller (205) implements a power control loop by adapting a power level of the power transfer signal in response to power control error messages received from the power receiver (105). A generator (209) introduces a power level variation sequence to the power transfer signal and a validity detector (211) detects data received by the communicator (207) to be invalid data for the power transfer in response to a comparison of the power level variation sequence and power change requests of the power control error messages.

13 Claims, 5 Drawing Sheets

(56) References Cited

U.S. PATENT DOCUMENTS

| | | | |
|---|---|---|---|
| 9,741,231 B2* | 8/2017 | Brandl | H04B 5/79 |
| 10,263,469 B2* | 4/2019 | Van Wageningen | H02J 50/10 |
| 10,418,891 B2* | 9/2019 | Takahashi | H02M 7/537 |
| 10,890,933 B2* | 1/2021 | Schat | H02M 3/00 |
| 2014/0232201 A1 | 8/2014 | Staring | |
| 2014/0368050 A1* | 12/2014 | Chun | H02J 50/40 |
| | | | 307/104 |
| 2015/0006395 A1* | 1/2015 | Chu | G06Q 20/40 |
| | | | 705/44 |
| 2015/0054454 A1* | 2/2015 | White, II | H02J 50/80 |
| | | | 320/108 |
| 2015/0091387 A1* | 4/2015 | Okazaki | H02J 50/12 |
| | | | 307/104 |
| 2015/0303995 A1* | 10/2015 | Staring | H04B 5/79 |
| | | | 307/104 |
| 2016/0087691 A1* | 3/2016 | Van Wageningen | H04B 5/79 |
| | | | 307/104 |
| 2017/0141624 A1* | 5/2017 | White, II | H02J 50/12 |
| 2017/0229920 A1 | 8/2017 | Joye et al. | |
| 2018/0131411 A1* | 5/2018 | Floresca | H04B 5/45 |
| 2018/0323648 A1* | 11/2018 | Joye | H02J 50/12 |
| 2019/0068004 A1 | 2/2019 | Louis | |
| 2020/0127706 A1* | 4/2020 | Guillot | B64D 47/00 |
| 2020/0227952 A1* | 7/2020 | Martchovsky | H02J 50/10 |
| 2021/0208205 A1* | 7/2021 | Swaans | H02J 50/12 |
| 2022/0294274 A1* | 9/2022 | Van Vugt | H02J 50/12 |
| 2023/0327496 A1* | 10/2023 | Sarasmo | H04L 12/10 |
| | | | 307/104 |

* cited by examiner

POWER TRANSMITTER, SYSTEM AND METHOD THEREFOR

CROSS-REFERENCE TO PRIOR APPLICATIONS

This application is the U.S. National Phase application under 35 U.S.C. § 371 of International Application No. PCT/EP2020/073526, filed on Aug. 21, 2020, which claims the benefit of EP Patent Application No. EP 19193803.4, filed on Aug. 27, 2019. These applications are hereby incorporated by reference herein.

FIELD OF THE INVENTION

The invention relates to a wireless power transmitter, system and a method therefor, and in particular, but not exclusively, to a wireless power transmitter for higher power transfer applications.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

Further developments seek to introduce a range of new applications and features. For example, the Wireless Power Consortium is developing a standard based on extending the principles of Qi to apply to a range of kitchen applications and appliances, including heaters, kettles, blenders, pans, etc. The developments in particular support much higher power levels for the power transfer and are known as the Cordless Kitchen standard. Other developments include medium power level applications for applications such as charging laptops, power tools etc.

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined wherein the power receiver communicates by performing load modulation of the power transfer signal transferring the power. Specifically, the loading of the power transfer signal by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power transfer signal as a data carrier. The power receiver modulates a load which is detected by a change in the amplitude and/or phase of the transmitter coil current or voltage. The data is formatted in bytes and packets.

More information can be found in chapter 6 of part 1 of the Qi wireless power specification (version 1.0).

Initially, Qi utilized only a unidirectional communication link, but bidirectional communication links have been introduced to allow more advanced control and flexibility of the power transfer operations. Communication from the power transmitter to the power receiver may for example be achieved by modulating the power transfer signal, e.g. using amplitude, frequency, or phase modulation.

However, it has been found that communication using the power transfer signal is not always optimal. Specifically, the communication capacity and possible data rate for communication using the power transfer signal as a carrier tends to be quite limited and often it is restricted to a few hundred bits/second. The suitability of the power transfer signal for communication tends to degrade substantially with increasing power levels.

In many higher power level power transfer systems, it has been proposed to use a separate communication system which is independent of the power transfer signal, and thus which specifically does not use the power transfer signal as a carrier for the communication link.

Such separate communication systems can typically provide a substantially higher data rate and may often provide more reliable communication. This may allow improved and more reliable power transfer in most practical applications.

However, whereas the use of a separate communication system may provide many advantages, the Inventors have realized that it may also in some scenarios result in less than optimal operation, and that it specifically may in some scenarios result in potential error situations e.g. when a power receiver is moved, removed, or replaced.

Hence, an improved power transfer approach would be advantageous, and in particular, an approach allowing increased flexibility, reduced cost, reduced complexity, enhanced user experience, additional or improved functions or services, more reliable operation, improved error detection, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for a wireless power transfer system including at least one power receiver for receiving a power transfer from the power transmitter via a wireless inductive power transfer signal; the power transmitter comprising: an output circuit comprising a transmitter coil for generating the power transfer signal in response to a drive signal being applied to the output circuit; a driver for generating the drive signal; a communicator for communicating with the power receiver, the communicator being arranged to receive data from the power receiver via a communication channel not using the power transfer signal as a communication carrier, the data including power control error messages; a power loop controller for implementing a power control loop, the power loop controller being arranged to adapt a power level of the power transfer signal in response to the power control error messages; a generator for introducing a power level variation sequence to the power transfer signal; and a validity detector for detecting data received by the communicator to be invalid data for the power transfer in response to a comparison of the power level variation sequence and power change requests of the power control error messages.

The invention may provide improved performance and/or operation in many wireless power transfer systems. It may provide improved operation including efficient control of the power transfer operation as well is mitigating or reducing the risk of undesired or undetected error scenarios arising, e.g. if a power receiver is removed.

The invention may in particular allow an extra layer of security by providing an approach for detecting that data received by an out-of-band communication (not using the power transfer signal as a communication carrier) is invalid (which specifically may reflect that it is likely not to be received from the power receiver which is receiving/extracting power from the power transfer signal).

The invention may in particular provide means for determining that the power transmitter is receiving data from the correct power receiver, and specifically that it is receiving data from the power receiver extracting power from the power transfer signal. This may reduce the risk of undesired scenarios wherein e.g. a power transfer to one power receiver is controlled by data from a close by power receiver possibly receiving power from another power transmitter (e.g. following a quick swap of two power receivers). The approach may be combined with other operations, such as power receiver authentication and power receiver removal detection, to provide a more reliable power transfer system.

The approach may achieve this (at least partially) using existing functionality and specifically may reuse power control loop functionality for determining the validity of data received via an out-of-band communication channel.

The approach does not require modification of power receivers and may be used with legacy power receivers thereby providing improved backwards compatibility.

The operation may further be performed during normal power transfer and is compatible with ongoing power transfer operation.

The power level variation sequence may be a pattern or signature imposed on the power level variation sequence.

The validity detector may be arranged to determine that the data received by the communicator is invalid in response to a detection that the comparison between the power level variation sequence and the power change requests meet a criterion. The criterion may comprise a requirement that the power change requests (suitably) match power change requests compensating/opposing/offsetting/reducing power level changes introduced to the power transfer signal by the power level variation sequence. The validity detector may generate a match indication which is indicative of a degree of matching between the received power change requests and expected power change requests compensating for power level variations of the power level variation sequence. The validity detector may determine that a match has not occurred, and that the data received by the communicator is invalid, if the match indication is below a threshold.

The validity detector may be arranged to detect that the power level variations induced by the power level variation sequence result in appropriate power change requests being received in the power control messages to compensate for the power level variations.

The validity detector may be arranged to modify or terminate the power transmitter in response to a detection of invalid data.

The comparison of the power level variation pattern and power change requests of the power control error messages may be a comparison of power control error messages received in a time interval in which the power control loop is reacting to changes introduced by the power level variation sequence by the generator.

In some embodiments, the validity detector may continuously compare the received power change requests to the power level variation sequence and if no match is found within a given time interval, the data may be determined as being invalid data.

The power change requests of the power control error messages may be from a subset of power control error messages. The power change requests of the power control error messages may be power change requests received in a time interval. In some embodiments, a timing of the time interval may be set relative to a time of the introducing of the power level variation sequence to the power transfer signal.

In accordance with an optional feature of the invention, the validity detector is arranged to determine a compensation measure indicative of a degree to which the power change requests match a compensation of power level variations of the power level variation sequence; and to detect data as invalid data for the power transfer in response to the compensation measure.

This may provide improved detection and operation in many embodiments.

The validity detector may determine the data as valid if the compensation measure exceeds threshold. Compensation for the power level variations of the power level variation sequence may correspond to power change requests offsetting/negating/opposing the power level variations introduced by the power level variation sequence.

In accordance with an optional feature of the invention, the validity detector is arranged to extract a requested power change sequence from the power control error messages; and to detect data received by the communicator as invalid data for the power transfer in response to a comparison of the power level variation sequence and the requested power change sequence.

This may provide improved detection, performance, and operation in many embodiments.

In some embodiments, the validity detector may be arranged to determine a similarity measure indicative of a match between variations in the power level variation sequence and variations in the requested power change sequence.

In some embodiments, the validity detector is arranged to designate data as valid in response to the correlation between the power level variation sequence and the requested power change sequence exceeding a threshold.

In accordance with an optional feature of the invention, the validity detector is arranged to designate data as invalid in response to a correlation between the power level variation sequence and the requested power change sequence.

In accordance with an optional feature of the invention, the validity detector is arranged to designate data as invalid in response to the correlation between the power level variation sequence and the requested power change sequence not exceeding a threshold.

In accordance with an optional feature of the invention, the power level variation sequence comprises at least three different power level offsets for the power transfer signal.

This may provide improved detection, performance, and operation in many embodiments. One of the at least three different power level offsets may be a zero offset.

In accordance with an optional feature of the invention, the power level variation sequence comprises at least one power level offset for the power transfer signal being constant for a duration of no less than three time intervals between power control error messages.

This may provide improved detection, performance, and operation in many embodiments.

In accordance with an optional feature of the invention, the power level variation sequence comprises only power level offsets for the power transfer signal of no more than 10% of a current power level of the power transfer signal.

This may in many embodiments reduce the impact of the introduction of the power level variation sequence to acceptable levels while allowing a sufficiently accurate detection.

In accordance with an optional feature of the invention, the validity detector is arranged to determine the data received by the communicator as invalid data in response to a detection that the power control error messages requests a power level change exceeding a power change threshold, the power change threshold exceeding a maximum power level offset of the power level variation sequence.

In accordance with an optional feature of the invention, the generator is arranged to introduce the power level variation sequence by applying a frequency offset variation sequence to a frequency of the power transfer signal.

This may provide improved detection, performance, and operation in many embodiments.

In accordance with an optional feature of the invention, the generator is arranged to adapt the power level variation sequence in response to a timing of the power control error messages.

This may provide improved detection, performance, and operation in many embodiments.

In accordance with an optional feature of the invention, the generator is arranged to adapt the power level variation sequence in response to power level variations requested by the power control error messages.

This may provide improved detection, performance, and operation in many embodiments.

In accordance with an optional feature of the invention, the validity detector is arranged to adapt a detection criterion for the comparison in response to power level variations requested by the power control error messages.

This may provide improved detection, performance, and operation in many embodiments.

In accordance with another aspect of the invention, there is provided a method of operation for a power transmitter for a wireless power transfer system including at least one power receiver for receiving a power transfer from the power transmitter via a wireless inductive power transfer signal; the power transmitter comprising: an output circuit comprising a transmitter coil for generating the power transfer signal in response to a drive signal being applied to the output circuit; and the method comprising: generating the drive signal; communicating with the power receiver, the communication including receiving data from the power receiver via a communication channel not using the power transfer signal as a communication carrier, the data including power control error messages; implementing a power control loop, the power control loop adapting a power level of the power transfer signal in response to the power control error messages; introducing a power level variation sequence to the power transfer signal; and detecting data received by the communicator to be invalid data for the power transfer in response to a comparison of the power level variation sequence and power change requests of the power control error messages.

In accordance with another aspect of the invention, there is provided a wireless power transfer system including at least one power transmitter and at least one power receiver for receiving a power transfer from the power transmitter via a wireless inductive power transfer signal; the power transmitter comprising: an output circuit comprising a transmitter coil for generating the power transfer signal in response to a drive signal being applied to the output circuit; a driver for generating the drive signal; a communicator for communicating with the power receiver, the communicator being arranged to receive data from the power receiver via a communication channel not using the power transfer signal as a communication carrier, the data including power control error messages; a power loop controller for implementing a power control loop, the power loop controller being arranged to adapt a power level of the power transfer signal in response to the power control error messages; a generator for introducing a power level variation sequence to the power transfer signal; a validity detector for detecting data received by the communicator to be invalid data for the power transfer in response to a comparison of the power level variation sequence and power change requests of the power control error messages.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specifications. However, it will be appreciated that the invention is not limited to this application but may be applied to many other wireless power transfer systems.

Figure 1:
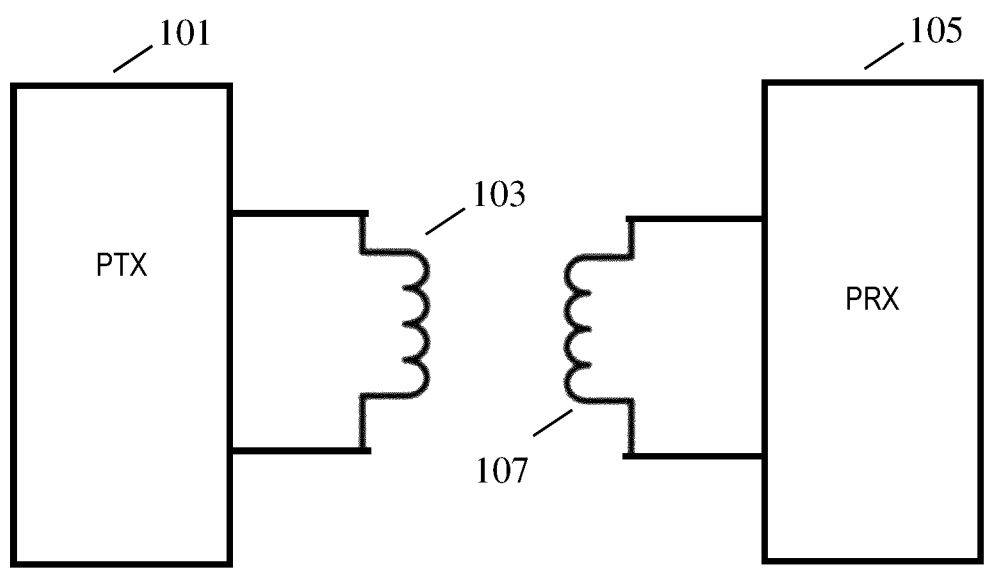
FIG. 1 illustrates an example of elements of a wireless power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides a wireless inductive power transfer from the power transmitter 101 to the power receiver 105. Specifically, the power transmitter 101 generates a wireless inductive power transfer signal (also referred to as a power transfer signal or an inductive power transfer signal), which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the receiver coil 107 are loosely coupled and thus the receiver coil 107 picks up (at least part of) the power transfer signal from the power transmitter 101. Thus, the power is transferred from the power transmitter 101 to the power receiver 105 via a wireless inductive coupling from the transmitter coil 103 to the receiver coil 107. The term power transfer signal is mainly used to refer to the inductive signal/magnetic field between the transmitter coil 103 and the receiver coil 107 (the magnetic flux signal), but it will be appreciated that by equivalence it may also be considered and used as a reference to an electrical signal provided to the transmitter coil 103 or picked up by the receiver coil 107.

In the example, the power receiver 105 is specifically a power receiver which receives power via receiver coil 107. However, in other embodiments, the power receiver 105 may comprise a metallic element, such as a metallic heating element, in which case the power transfer signal induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications, and in excess of 100 W and up to more than 1000 W for high power applications supported by the Cordless Kitchen standard being developed by the Wireless Power Consortium.

In the following, the operation of the power transmitter 101 and the power receiver 105 will be described with specific reference to an embodiment in accordance with the Qi Specification (except for the herein described (or consequential) modifications and enhancements) or suitable for the higher power Cordless Kitchen specification.

The system of FIG. 1 utilizes bidirectional communication to support the power transfer operation. The bidirectional communication is used to configure, establish, and control the power transfer and may include exchange of a range of control data. In particular, a communication channel between the wireless power transmitter and the wireless power receiver is considered as essential in order to establish a feedback loop from the wireless power receiver to the wireless power transmitter, which is vital for power system stability.

As an example, the current Qi specification limits the amount of power for wireless power transfer to 15 watt. Such an amount of power might be considered as a low power wireless power system. This system uses modulation of the power transfer signal as a communication means between the power transmitter and the power receiver. This is also known as an in-band communication channel.

However, such communication is not ideal for all systems, and especially tends to be suboptimal for higher power levels. Specifically, for applications with higher transfer power levels, the modulation of the power transfer signal creates an additional source of losses and with increased power levels absolute values of losses also arises. These losses cause heat dissipation, e.g. in power electronic circuits of the wireless power system, or in materials within an operational range of the wireless power system. Also, electromagnetic interference may increase and is often a limiting factor.

Also, in order to provide efficient control of the power transfer, it is desirable to have a high communication data rate between the power transmitter and the power receiver. However, this is typically very difficult to achieve using the power transfer signal as a carrier signal, and in particular for higher power applications, such as kitchen applications, the achievable data rate is typically too low to support the desired functionality. Specifically, with an operational frequency of the power transfer signal in the order of 20 to 300 kHz, the bandwidth of the channel is often not sufficient for more complex operations, such as e.g. for power receiver authorization. The power transmitter to power receiver communication may be needed for control errors but also for authentication (typically requiring a high data rate) as well as possibly other applications (e.g. even including providing an Internet connection).

Accordingly, higher power level systems, such as those compatible with the Cordless Kitchen specification, tend to replace the in-band communication using the power transfer signal with an out-of-band communication channel that is implemented by a separate and typically dedicated short range communication system. This separate communication system is independent of the power transfer signal and does not use the power transfer signal as a carrier for the communication. It is often a short range communication system, such as for example a Bluetooth or an NFC communication system.

Figure 2:
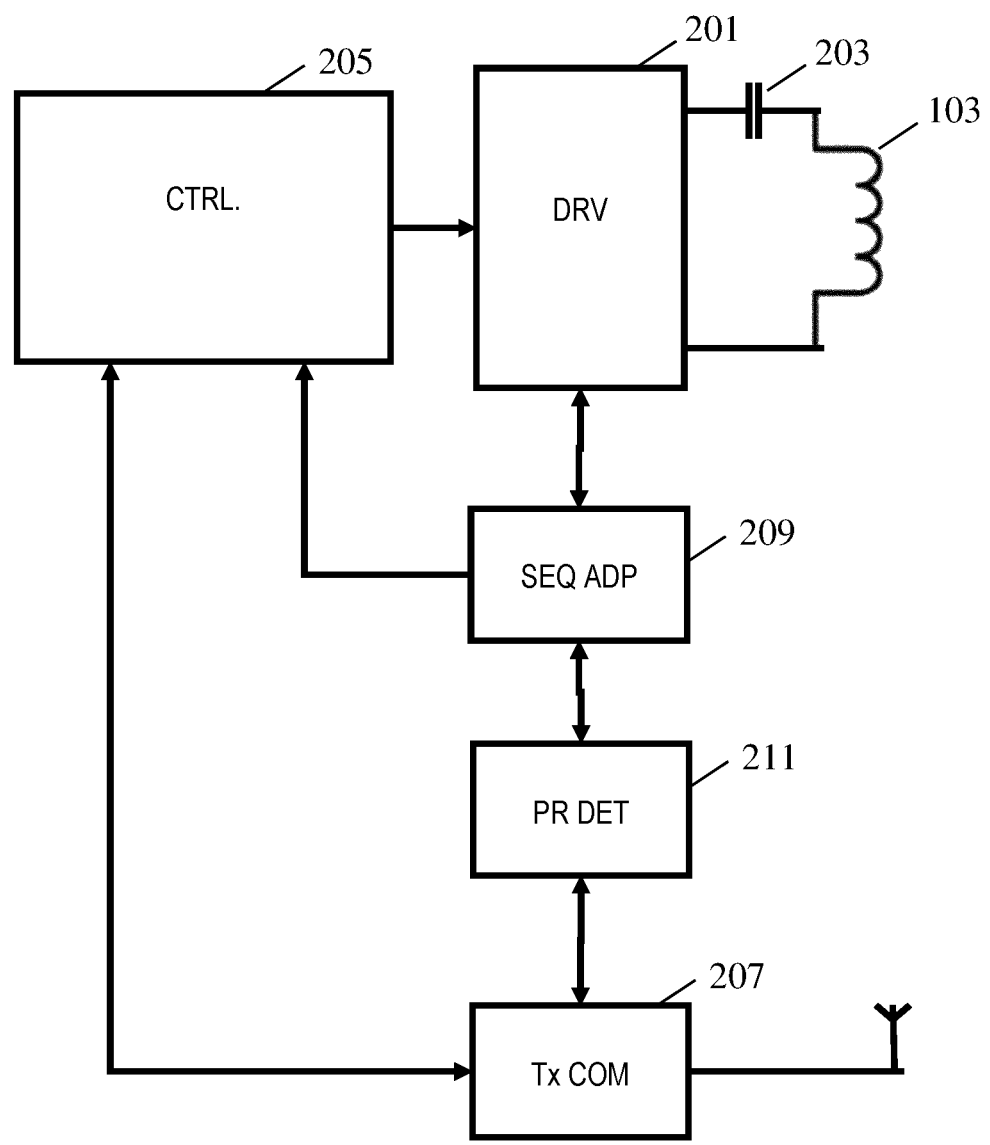
FIG. 2 illustrates an example of elements of a power transmitter in accordance with some embodiments of the invention.
Figure 3:
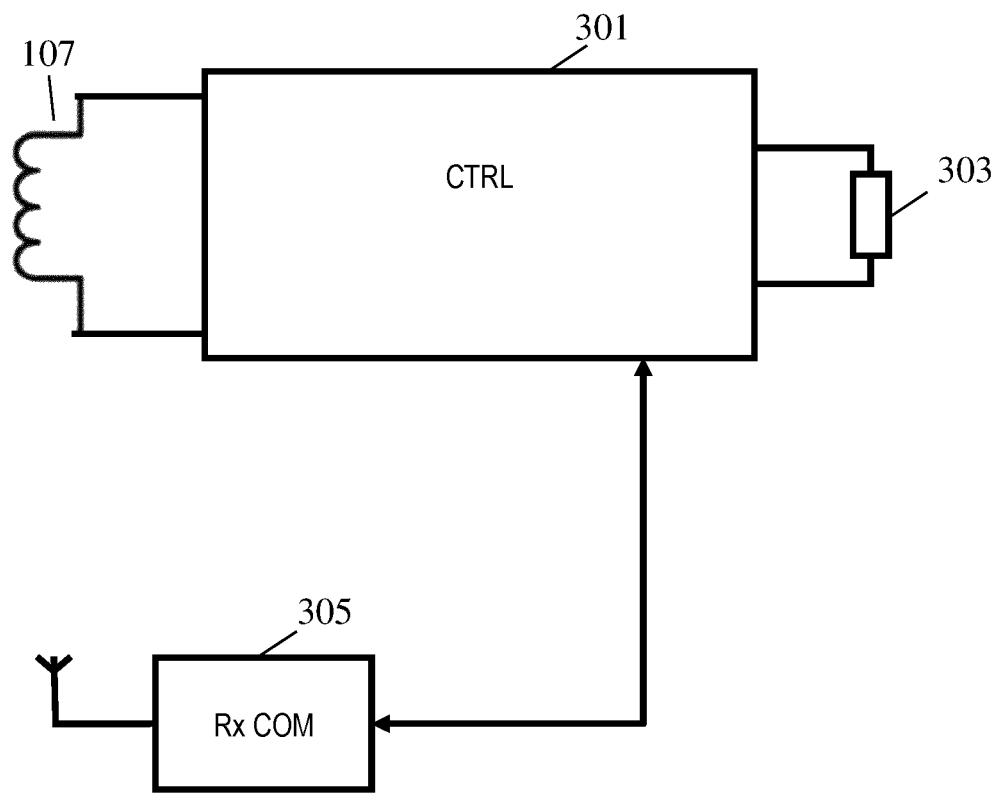
FIG. 3 illustrates an example of elements of a power receiver for a wireless power transfer system in accordance with some embodiments of the invention.

The system of FIG. 1 will be described in further detail with reference to FIG. 2 which illustrates elements of the power transmitter 101 and FIG. 3 illustrates elements of the power receiver 105 of FIG. 1 in more detail.

The power transmitter 101 includes a driver 201 which can generate a drive signal that is fed to an output circuit which in the example is a resonance circuit formed by the transmitter coil 103 and a transmitter capacitor 203. The transmitter coil 103 in return to being driven by the drive signal generates an electromagnetic field and thus the electromagnetic power transfer signal which provides power transfer to the power receiver 105. The power transfer signal is provided (at least) during a power transfer phase.

Figure 4:
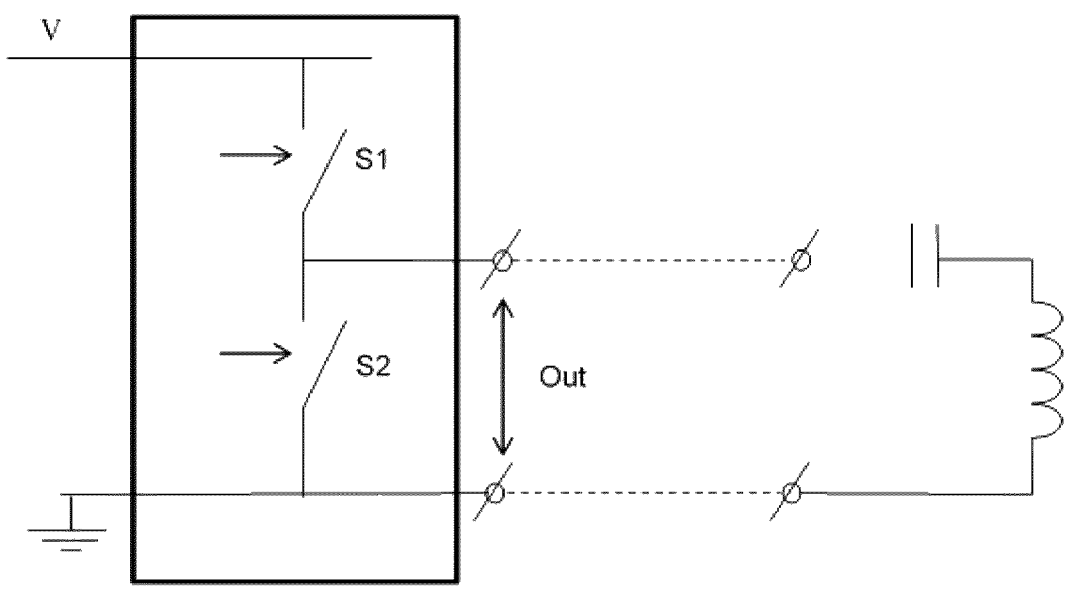
FIG. 4 illustrates an example of elements of a driver for a power transmitter in accordance with some embodiments of the invention.
Figure 5:
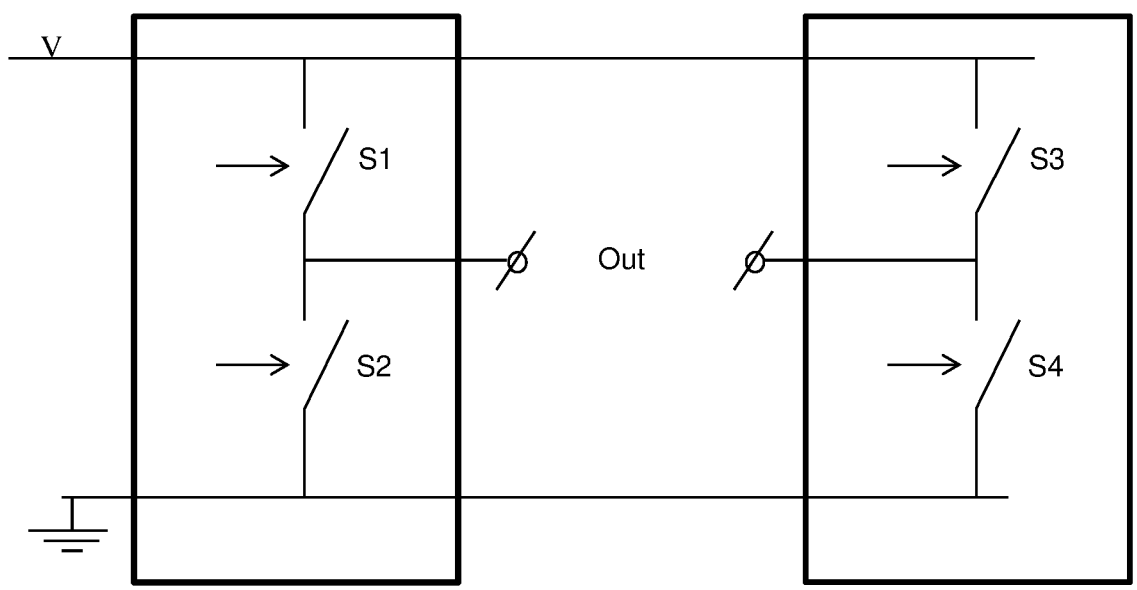
FIG. 5 illustrates an example of elements of a driver for a power transmitter in accordance with some embodiments of the invention.

The driver 301 is typically a drive circuit in the form of an inverter which generates an alternating signal from a DC Voltage. The output of the driver 201 is typically a switch bridge generating the drive signal by the appropriate switching of switches of the switch bridge. FIG. 4 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 5 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are open and closed with the desired frequency.

The driver 201 thus generates a drive signal for the output resonance circuit and thus for the transmitter coil 103.

The driver 201 is coupled to a power transmitter controller 205 which is arranged to control the operation of the power transmitter 101. The power transmitter controller 205 may be arranged to control the operation of the power transmitter 101 to perform the required and desired functions associated with power transfer protocols of the system, and may specifically in the present example be arranged to control the power transmitter 101 to operate in accordance with the Cordless Kitchen Specifications. For example, the power transmitter controller 205 may comprise functionality for detecting a power receiver, for initiating power transfer, for supporting power transfer, for terminating power transfer etc.

The power transmitter 101 further comprises a transmitter communicator 207 which is arranged to communicate with the power receiver 105 independently of the power transfer signal, and thus without using the power transfer signal as a communication carrier. The transmitter communicator 207 is arranged to communicate with the power receiver 105 using a communication link that uses a different communication carrier than the power transfer signal. Thus, the transmitter communicator 207 establishes an out-of-band communication link which is independent of the power transfer signal and the data communicated via this link is not modulated onto the power transfer signal.

The power transmitter thus communicates with the power receiver using a communication system and channel that is not limited or restricted by the use of the power transfer signal as a communication carrier.

The exact communication approach and the communication carrier used may be different in different embodiments and may depend on the preferences and requirements of the specific application. The out-of-band communication link is typically implemented by a short-range communication system that however has a range which is substantially larger than the range of the power transfer and which substantially exceeds the wireless power transfer operational volume.

In many embodiments, the in-band communication link may be implemented by a standardized short-range communication system, such as a Bluetooth or NFC communication system. Such communication systems may provide an efficient out-of-band communication link that provides a high data rate, reliable communication, and typically low-cost implementation. It may specifically enable efficient exchange of control data for the power transfer. In many embodiments, the transmitter communicator 207 may support bidirectional communication but it will be appreciated that in some embodiments, the communication may only be in one direction.

As illustrated in FIG. 3, the receiver coil 107 of the power receiver 105 is coupled to a power receiver controller 301 which couples the receiver coil 107 to a load 303. The power receiver controller 301 includes a power control path which converts the power extracted by the receiver coil 107 into a suitable supply for the load 303. In addition, the power receiver controller 301 may include various power receiver controller functionality required to perform power transfer, and in particular functions required to perform power transfer in accordance with the Cordless Kitchen specifications.

The power receiver 105 further comprises a receiver communicator 305 which establishes an out-of-band communication link with the transmitter communicator 207. The receiver communicator 305 may thus be the complementary to the first transmitter communicator 205.

The system accordingly uses out-of-band communication to exchange data between the power transmitter 101 and the power receiver 105. The data being exchanged is specifically various control and configuration data required, desired, or specified for the specific wireless transfer system, such as specifically Qi control data or Cordless Kitchen Power control data.

In particular, the system utilizes the out-of-band communication channel to implement a power control loop. The power receiver controller 301 may specifically monitor whether the power level of the power transfer signal is too high or too low and generate a power error indication/power change request which is then transmitted to the power transmitter in power control error messages by the receiver communicator 305. The transmitter communicator 207 of power transmitter 101 receives the power control error messages and may forward this to the power transmitter controller 205 which may implement the power control loop functionality.

The power transmitter controller 205 is arranged to adapt the power level of the power transfer signal in response to the received power control error messages. If a power error indicator is received indicating that the current power transfer signal power level is too low, the power transmitter controller 205 increases the power level by e.g. a predetermined amount. If a power error indicator is received indicating that the current power transfer signal power level is too high, the power transmitter controller 205 decreases the power level by e.g. a predetermined amount. In some embodiments, the received power control error messages may receive power change requests which not only indicate a direction of change but also a requested magnitude or size of the change.

The power receiver 105 may transmit the power control error messages at relatively short intervals. In Qi it is required that power control error messages are transmitted at least every 250 msec but in many embodiments the intervals may be substantially shorter. For example, for motor regulation, power control error messages may be transmitted with intervals around e.g. 10 msec.

The power receiver 105 may thus continuously through the transmission of power control error messages control the power level of the power transfer signal to a desired level. The power transmitter and power receiver accordingly implement a power control loop to maintain the desired power level.

The use of an out-of-band communication channel and system for exchanging control data, such as the power control error messages, may provide a number of advantages including allowing a high data rate and providing more reliable communication than if the power transfer signal was used as a communication carrier for e.g. FM, AM, or PM modulation (from power transmitter to power receiver) or for load modulation (from power receiver to power transmitter). However, the Inventors have realized that there may also be associated disadvantages with the approach. In particular, the Inventors have realized that the use of an out-of-band communication system may increase the risk of interference between adjacent power transfer operations and/or increase the risk that a power transfer operation may be controlled by a power receiver other than the intended power receiver, i.e. other than the power receiver to which power is being transferred.

The Inventors have realized that whereas the conventional in-band communication provides a close linkage between the communication and the power transfer, this may not be present to the same extent when an out-of-band communication channel is used. Specifically, the Inventors have realized that the range of the out-of-band communication is typically substantially larger than the range of the power transfer signal and the distance between the power transmitter and the power receiver during power transfer, and that this may increase the risk of scenarios in which the communication received by a power transmitter may not necessarily be received from the power receiver being powered but may e.g. be from another power receiver in the vicinity of the power transmitter. Similar issues can arise if there is a positional offset between the power transfer coils and communication coils even if the range of the out-of-band communication is smaller than the power transfer range, such as e.g. may be the case for NFC communication.

In order to address such issues, power transfer systems may include functionality for detecting if a power receiver is removed from the power transmitter, and for terminating a power transfer if this happens. For example, if the power transmitter detects a rapid and very substantial reduction in the power being extracted from the power transfer signal, it may determine that this may possibly be because the power receiver has been removed, and it may therefore proceed to terminate the power transfer. This will ensure that e.g. if a kettle or blender being wirelessly powered is removed from the designated power area of e.g. a kitchen worktop, the power transfer is terminated and the power transfer signal is removed.

However, the Inventors have realized that even such a function may potentially still allow undesirable situations to occur. For example, if a worktop has two close power areas and a pan is positioned on each of these, a user may possibly quickly shift the pans around (e.g. to facilitate the user stirring the contents of one pan). This may result in the two pans shifting power transmitters and thus being powered by power transfer signals of different power transmitters than before the swap (i.e. the power transmitter will also swap).

However, the out-of-band communication may have a range that still allows the previous communication to continue despite the new positions and as a consequence each power transmitter may receive power control error messages from the pan powered by the other power transmitter. In other words, the powering of the pans may switch between the two power transmitter without a corresponding switch in communication occurring. Such a scenario may result in undesirable operation as both power control loops are effectively disrupted.

The system of FIGS. 1-3 comprises specific functionality that allows a close linking between the power transfer signal and the out-of-band communication for a power transmitter and power transmitter pair. This may provide improved reliability and operation and may in many applications reduce the risk of scenarios as described above occurring.

In the exemplary system, the power transmitter 101 comprises a generator function which in the following will be referred to as a sequence adaptor 209. The sequence adaptor 209 is arranged to introduce a power level variation sequence to the power transfer signal.

The power transmitter 101 further comprises a validity detector 211 which is arranged to detect that data received by the communicator is invalid data for the current power transfer in response to a comparison of the power level variation sequence to power change requests received in the power control error messages.

The generator and the validity detector may be implemented in any suitable form such as in a discrete electronic circuit. However, in most embodiments, the generator and validity detector will at least partly be implemented as executable code being executed by a suitable processing unit or units, such as e.g. firmware or software running on a central processing unit, signal processing unit, microcontroller, or microprocessor or any other suitable processing means.

The validity detector 211 is specifically fed information of the power level variation sequence that has been introduced by the sequence adaptor 209. It then monitors the power change requests to detect if these match the power level variations introduced by the sequence adaptor 209. For example, if the power extracted by the power receiver for the load 303 is constant for the duration of the power level variation sequence, the power requests would be expected to oppose the introduced variation. E.g. if the power level variation sequence includes an increase in the power level, this will by the power receiver be detected as the power level being too high for the load and accordingly it will proceed to generate one or more power reduction requests and transmit such in one or more power control error messages. If the power level variation sequence then reverts back to a zero power level offset, this will now result in the power level being detected to be too low by the power receiver and this may accordingly generate power increase requests and send these to the power transmitter in the power control error messages. The power level variation sequence may then introduce a negative offset thereby reducing the power level further resulting in further power increase requests. Finally, the power level variation sequence may return to a zero offset resulting in the power control error messages comprising power reduction requests. In this way, the power requests of the power control error messages may reflect the power level variation sequence.

The validity detector 211 is thus provided with information of the power level variation sequence and from this it can generate an estimate of the expected power requests comprised in the power control error messages, i.e. a sequence of estimated power change requests may be determined. This estimated sequence can then be compared to the received sequence and if these match sufficiently closely in accordance with a suitable criterion, then the data received by the transmitter communicator 207 is considered to be valid and to be data transmitted from the power receiver that is indeed currently being powered by the power transfer signal.

However, if the estimated and received sequences do not match sufficiently closely, it indicates that the received power control error messages are not actually received from the power receiver that is being powered by the power transfer signal, i.e. it indicates that the received data is not closely linked to the generated power transfer signal. In this case the received data may be considered to be invalid.

The power transmitter may take different actions in response to detecting invalid data depending on the preferences and requirements of the individual embodiment and application. In many embodiments, it may proceed to modify or terminate the power transfer in response to a detection of invalid data. In many embodiments, the detection of invalid data may result in the power transfer operation being terminated completely. In other embodiments, it may for example proceed to limit the power level of the power transfer signal, for example a maximum power level may be imposed.

The sequence adaptor 209 may thus introduce a power level variation to the power transfer signal. This power level variation may be in addition to other power level variations and specifically may be in addition to the power level variations resulting from the power control operation. Thus, on top of the power level variations that may occur due to the power transfer operation, the sequence adaptor 209 may introduce variations that are not related to the power transfer operation and which specifically in most scenarios are independent of the power control error messages, and indeed typically may be independent of all data received from the power receiver. The power level variation sequence may thus be a power level variation pattern or signature that may be overlaid the power transfer signal.

The sequence will result in power level variations that the power control loop will seek to compensate, oppose, and negate. It does so by the power change requests received in the power control error messages seeking to cause an opposite power level change. The effect of the power level variation sequence is accordingly reflected by the power change requests received from the power receiver and by comparing the power change requests to those expected for the given sequence.

The validity detector 211 may determine a compensation measure which reflects the degree to which the power change requests match a compensation of power level variations of the power level variation sequence. The detection of whether the out-of-band communication is providing valid data from the power receiver currently being exposed to the power transfer signal may then be determined based on this compensation measure. For example, if the compensation measure is above a given threshold, it may be determined that the received data is valid and otherwise it may be determined that it is invalid.

The compensation for the power level variation sequence may be requests to oppose the changes introduced by the power level variation sequence, i.e. it may be by power change requests that request power level changes that are opposite the changes introduced by the power level variation sequence.

In some embodiments, the validity detector 211 be arranged to extract a requested power change sequence from the power control error messages. The requested power change sequence may be indicative of the power changes requested in the power control error messages, and the validity detector may specifically generate a sequence or pattern of the power changes that are requested by the power control error messages. The requested power change sequence may reflect the power level changes that result from adapting the power transfer signal as requested by the power control error messages. Thus, the requested power change sequence may specifically be a requested power level variation sequence. For example, if a power control error message is received which request that the power level is increased by, say, 1 W, then the requested power level variation sequence may be increased by adding another power level data point being 1 W higher than the previous value.

The validity detector 211 may then determine the similarity between the power level variation sequence and the requested power change sequence (and specifically the requested power level variation sequence). The validity detector 211 may generate a suitable similarity or match measure using a suitable similarity or match metric.

For example, in many embodiments, a correlation between the power level variation sequence imposed by the sequence adaptor 209 and the requested power level variation sequence generated by the validity detector 211 may be determined and may be used as a similarity measure.

If the similarity measure indicates that the sequences are sufficiently similar, the validity detector 211 may determine that the received power control error messages are linked to the power transfer signal and thus that they are received from the power receiver that is currently being provided with the power transfer signal. Thus, the power transfer signal and the communication are in this case closely linked and the received data is indeed from the power receiver to which power is being transferred. Accordingly, the validity detector 211 may determine that the received data and the out-of-band communication in general is valid and that the power transfer can proceed without any intervention.

However, if the similarity measure indicates that the similarity is not sufficiently high, it may be determined that there is an unacceptably high risk that the data is indeed received from a power receiver that is currently not exposed to and extract power from the power transfer signal. Accordingly, the received data, and the out-of-band communication channel in general, may be considered to not be valid. This may result in the power transfer being terminated.

In many embodiments, validity detector 211 may specifically be arranged to correlate the power level variation sequence and the requested power change sequence and to consider the data valid if the correlation between these is sufficiently high.

It will be appreciated that as the power change requests seek to oppose the power level variations introduced by the power level variation sequence, the requested power change sequence may be generated to be an inversion of the requested power changes. For example, a request to increase the power level by a given amount may be reflected by a reduced power level in the requested power change sequence. Alternatively, the similarity measure may be modified, e.g. by changing the sign of the correlation value or the decision criterion may be adapted to take this into consideration (for example by requiring a high negative value of the correlation measure).

Thus, the comparison of the power level variation sequence and the requested power change sequence may reflect that an increase in the power level for the requested power change sequence is compensated by a request for a reduced power level (and vice versa).

The validity detector 211 may thus be arranged to determine a similarity measure indicative of a match between variations in the power level variation sequence and variations in the requested power change sequence. It may further be arranged to designate data as valid in response to the correlation between the power level variation sequence and the requested power change sequence exceeding a threshold.

The specific power level variation sequence used may be selected depending on the specific properties, requirements, and preferences of the individual embodiment.

The power level variation sequence may in many embodiments be a predetermined sequence or pattern and the sequence may be known in advance by the validity detector 211. In other embodiments, the power level variation sequence may not be predetermined but may e.g. be randomly generated by the sequence adaptor 209. In this case, the sequence adaptor 209 may provide information to the validity detector 211 of the specific power level variation sequence being used.

In many embodiments, the power level variation sequence may be a sequence of power level offsets that are applied to the power transfer signal. Thus, the power level of the power transfer signal may be determined based on the power control loop operation and in addition to this setting, the sequence adaptor 209 may add a sequence of power level offsets that are not depending on the power control loop. In other embodiments, the power level variation sequence may e.g. be a relative power level change such as a scaling of the power level by a varying gain factor (that typically would be close to unity).

In some embodiments, the power level variation sequence may be a single binary sequence where the power level offset or scale factor simply switches between two different levels in accordance with a suitable pattern. For example, the sequence adaptor 209 may periodically switch between applying a positive power level offset (increasing the power level by a small predetermined amount) and applying a negative power level offset (decreasing the power level by a small predetermined amount). It would be expected that this would result in a bias towards power reduction requests for a short time following the switch to apply a small positive offset and a bias towards power increase requests for a short time following the switch to apply a small negative offset. The validity detector 211 may accordingly evaluate the power control error messages to detect if such biases are present. If not, the out-of-band communication may be designated as invalid.

In many embodiments, the power level variation sequence may comprise power level offsets for the power transfer signal which are constant for a duration of no less than three, and sometimes no less than 5 or 10, time intervals between power control error messages. Thus, the offsets may be constant for at least some received power control error messages. This may in many embodiments provide improved reliability in detecting the response of the power control loop to the power level variation sequence. It may specifically in many scenarios provide increased time for the loop to adapt to the changes in the power level offset and may reduce the uncertainty and noise in detecting whether the received power control error messages match the power level variation sequence.

The power level variation sequence may in some embodiments be binary and involve only two possibly power level variations. However, in many embodiments, the power level variation sequence may comprise more than two power level variations. Specifically, in many embodiments, the power level variation sequence may comprise at least three different power level offsets for the power transfer signal.

For example, in many embodiments, the power level variation sequence may apply a varying power level offset which includes offsets of different magnitudes. Thus, some offsets may be larger than others resulting in the power change requests requesting larger changes. In many embodiments, a power change request may indicate a size of the requested power level change. For example, a power control error message may comprise a byte being a signed integer with the integer indicating the size of the step change required. In such embodiments, the validity detector 211 may further consider the magnitude of the offset and the magnitude of the requested power level changes by the power control error messages.

For example, the validity detector 211 may generate a requested power level variation sequence which reflects not just the direction of the requested power level changes but also the size of these. This may be compared to the introduced power level variation sequence, e.g. by determining a correlation value that reflects the magnitude variations of the sequences.

In many embodiments, such an approach may provide an improved reliability in the detection of whether the power control error messages reflect the introduced power level variation sequence or not, and thus a more reliable detection of whether the out-of-band communication is valid or not.

The power level variation sequence is in most embodiments relatively small power level variations that do not significantly affect the power transfer or require large compensations by the power control loop. This may minimize the impact on the power transfer operation. At the same time, the power level variation sequence preferably includes variations that are sufficiently large for the response by the power control loop to be sufficiently reliably detected. Preferably the average power level variation introduced by the power level variation sequence is substantially zero.

In many embodiments, the power level variation sequence comprises only power level offsets for the power transfer signal of no more than 10% (or 5%) of a current power level of the power transfer signal.

In many embodiments, the power level variation sequence comprises only power level offsets for the power transfer signal of no more than 10% (or 5%, or 1%) of a maximum power level of the power transfer signal for the power transfer.

This may allow the impact of the power level variation sequence to be sufficiently small to not cause unacceptable impact on the ongoing power transfer operation yet still allow reliable detection.

It will be appreciated that in many embodiments, there may be a timing correlation or synchronization between the operation of the sequence adaptor 209 and the validity detector 211.

For example, in some embodiments, the power level variation sequence may be introduced in relatively short time intervals with a relatively long intervening intervals in which no power level variation sequence is introduced. In such cases, the validity detector 211 may be arranged to evaluate the response of the power control loop in a detection time interval which is synchronized to the sequence interval. The timing and duration of this detection time interval may depend on the response times and temporal properties of the power control loop.

For example, the validity detector 211 may monitor the power control error messages in a detection time interval that begins at the start of the sequence interval and end a predetermined amount of time after the sequence interval. The end time may be selected to ensure that the power control loop has time to react to the last offsets of the power level variation sequence.

The validity detector 211 may then search for the power level variation sequence within this time interval. For example, a requested power level variation sequence may be generated for the entire interval, and a correlation value between this and the introduced power level variation sequence for different time offsets between the sequences. The maximum correlation value may then be considered to correspond to a similarity value, and if this is above a given threshold, the out-of-band communication may be considered to be valid.

In other embodiments, the sequence adaptor 209 may e.g. continuously apply a power level variation sequence and e.g. a predetermined limited length power level variation sequence may be continuously repeated to provide a continuous sequence. The validity detector 211 may synchronize to this (e.g. by finding a time offset resulting in the highest correlation value) and continuously evaluate the match over a sufficiently large sliding window.

In many embodiments, the power level variation sequence may be a predetermined power level variation sequence. However, in other embodiments, the sequence adaptor 209 may be arranged to dynamically adapt the power level variation sequence in response to one or more operating parameters.

In some embodiments, the sequence adaptor 209 may be arranged to adapt the power level variation sequence in response to a timing of the power control error messages. For example, the power level variation sequence may be adapted in response to the frequency at which the power control error messages are received.

As a specific example, a power transmitter may power a kitchen appliance such as a kettle in which the powered function is a heating of a heating element. This will typically be a slowly varying operation and therefore power control error messages are transmitted relatively infrequently, say at intervals of around 250 msec. If instead the power transmitter powers a motor driven appliance, such as a blender, a faster power control may be required to maintain a desired speed, and therefore a more frequent transmission of power control error messages is utilized. For example, power control error messages may be transmitted at 10 msec time intervals.

In such an example, the sequence adaptor 209 may adapt the power level variation sequence to have much more frequent changes for the second scenario than for the first scenario, i.e. faster variations may be introduced for a higher frequency of power control error messages being transmitted. This may adapt the detection process to the specific conditions and provide an improved and more reliable test in most embodiments.

In some embodiments, the sequence adaptor 209 may be arranged adapt the power level variation sequence in response to power level variations requested by the power control error messages. For example, it may be arranged to adapt a magnitude of variations of the power level variation sequence in response to power level variations requested by the power control error messages. Specifically, the magnitude of variations may be increased for an increasing level of variations in the requested power changes of the power control error messages.

As an example, some power receivers may require a substantially constant power with very little variation. For example, a battery charger may extract a substantially constant power. In this case, the power control error messages will typically request no or little change in the power level. Accordingly, even relatively small power level changes introduced by the sequence adaptor 209 can be detected in the power control error messages over power level change requests resulting from the power transfer operation. Accordingly, in this case, the power level variation sequence may be set to have relatively small power level variations.

If instead, the power receiver is one that requires frequent and substantial power level changes and therefore transmits many and large power level change requests (e.g. to control a motor experiencing changing loads), it will be much more difficult for the validity detector 211 to detect small power level variations. In such a scenario, the sequence adaptor 209 may in response to the large and frequent power level change requests, set the power level variation sequence to have large power level variations thereby resulting in larger compensation being required by the power control loop. This may facilitate and/or improve detection.

In some embodiments, the validity detector 211 may alternatively or additionally be arranged to adapt a detection criterion for the comparison in response to power level variations requested by the power control error messages. For example, if the power control error messages include requests for frequent and/or large changes (and specifically more frequent and larger than those required to compensate for the power level variation sequence), then the validity detector 211 may increase the detection interval to be over a longer duration.

Alternatively or additionally, the validity detector 211 may in such a scenario modify a detection threshold such that e.g. the out-of-band communication is considered to be valid even for lower values of the similarity measure or correlation.

Indeed, in many scenarios, the validity detector 211 may be arranged to determine the data as valid data in response to a detection that the power control error messages request a power level change exceeding a power change threshold. The validity detector 211 may specifically be arranged to negate a detection of data as invalid data in response to a detection that the power control error messages request a power level change exceeding a power change threshold.

This power level change may be determined for a time interval that may include, exclude, or only include the time interval in which the power change requests used for the comparison is made (i.e. in some embodiments a detection may be negated if the power level change in the comparison interval is too high, in other embodiments, a detection may be negated if the power level change outside (e.g. just before) the comparison interval is too high, and in some embodiments, a detection may be negated if the power level change in a time interval including both a non-comparison and the comparison interval is too high).

Thus, in such a scenario, the validity detector 211 may proceed to detect that the requested power changes are above a given threshold, and if this occurs it may be considered that the detection of invalid data is inhibited as it may not be a sufficiently reliable detection operation.

The power change threshold for this will exceed the maximum power level offset of the power level variation sequence, i.e. the inhibition of the detection will only occur if the requested power changes are higher than (and typically substantially higher than) the changes that would be required and expected to compensate for the power level variation sequence.

The requested power level variations may in some embodiments exclude power level variations resulting from the power change requests used in the comparison, may in other embodiments include power level variations resulting from the power change requests used in the comparison as well as other power level variations, and indeed in some embodiments may be based only on power level variations resulting from the power change requests used in the comparison.

As another specific example of adaptation of the detection criterion, the system may e.g. generate a measure of the level of requested power level variations in the past N seconds. When a comparison is being made, the system may e.g. adapt the duration of the comparison dependent on this measure such that the higher the level of requested power level variations, the longer the duration thereby compensating for noise introduced to the comparison by power level variations not directly resulting from the power level variation sequence. If the time interval of N seconds is selected to be N seconds prior to the power level variation sequence being introduced, then an approach may be implemented where the adaptation is based on requested power level variations that do not include the power change requests used in the comparison. However, if the time interval of N seconds is selected to be N seconds immediately prior to performing the comparison (and thus after the power change requests used in the comparison have been received), then an approach may be implemented where the adaptation is based on requested power level variations that does include the power change requests used in the comparison. Indeed, if the time interval of N seconds is less than the time interval during which the power change requests used in the comparison have been received, the adaptation of the detection criterion may be based only on requested power level variations that are also considered in the comparison.

It will be appreciated that the sequence adaptor 209 may use different approaches to introduce the power level variation sequence in different embodiments. In some embodiments, the power level variations may simply be introduced by changing the voltage and/or current of the drive signal in accordance with the power level variation sequence. For example, the supply voltage to the output inverter of the driver 201 may be modified in accordance with the variations of the power level variation sequence.

In some embodiments, the sequence adaptor 209 may be arranged to introduce the power level variation sequence by applying a frequency offset variation sequence to a frequency of the power transfer signal.

In many wireless power transfer systems, the power transmitter and/or power receiver may use resonance circuits for the power transfer. In such scenarios, the power level may be adapted by changing the frequency of the drive signal and thus adjusting the frequency of the power transfer signal to be closer to or further from the resonance frequency of the resonance circuits. In some embodiments, the power level may be adapted by changing the phase or duty cycle of the drive signal.

In some embodiments, such a frequency control may be used to introduce the power level variation sequence. For example, a positive power level offset may be introduced by adjusting the frequency to be closer to the resonance frequencies and a negative power level offset may be introduced by adjusting the frequency to be further from the resonance frequencies. The power receiver will respond to such power level variations by transmitting suitable power change requests which can then be compared to the power level variation sequence.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
   an output circuit,
      wherein the output circuit comprises a transmitter coil,
      wherein the transmitter coil is configured to generate a power transfer signal in response to a drive signal;
   a driver circuit, wherein the driver circuit is configured to generate the drive signal;
   a communicator circuit,
   wherein the communicator circuit is configured to communicate with a power receiver,
      wherein the communicator circuit is arranged to receive data from the power receiver via a communication channel,
      wherein the communication channel does not use the power transfer signal,
      wherein the data comprises at least one error message,
   wherein the at least one error message comprise at least one power change request;
   a power loop controller circuit, wherein the power loop controller circuit is configured to implement a power control loop,
wherein the power loop controller circuit is arranged to adapt a power level of the power transfer signal in response to the at least one error message;
a generator circuit, wherein the generator circuit is configured to introduce a power level variation sequence to the power transfer signal;
a validity detector circuit,
wherein the validity detector circuit is configured to detect invalidity of a portion of the data,
wherein the data is invalid when the power level variation sequence and the at least one power change request conflict.

2. The power transmitter of claim 1,
wherein the validity detector circuit is arranged to determine a compensation measure,
wherein the compensation measure is indicative of a degree to which the at least one power change request match a compensation of power level variations of the power level variation sequence,
wherein the validity detector circuit is arranged to detect invalidity of the portion of the data the power transfer in response to the compensation measure.

3. The power transmitter of claim 1,
wherein the validity detector circuit is arranged to extract a requested power change sequence from the at least one error message,
wherein the validity detector circuit is arranged detect invalidity of the portion of the data in response to a comparison of the power level variation sequence and the requested power change sequence.

4. The power transmitter of claim 3, wherein the validity detector circuit is arranged to detect invalidity of the portion of the data in response to a correlation between the power level variation sequence and the requested power change sequence.

5. The power transmitter of claim 4, wherein the validity detector circuit is arranged to detect invalidity of the portion of the data in response to the correlation between the power level variation sequence and the requested power change sequence not exceeding a threshold.

6. The power transmitter of claim 1, wherein the power level variation sequence comprises at least three different power level offsets for the power transfer signal.

7. The power transmitter of claim 1,
wherein the at least one error message comprises at least two error messages,
wherein the power level variation sequence comprises at least one power level offset for the power transfer signal,
wherein the at least one power level offset is constant for a duration of no less than three time intervals between the at least two error messages.

8. The power transmitter of claim 1,
wherein the power level variation sequence comprises only power level offsets for the power transfer signal,
wherein the power level offsets are of no more than 10% of a current power level of the power transfer signal.

9. The power transmitter of claim 1,
wherein the validity detector circuit is arranged to detect invalidity of the portion of the data in response to a detection that the at least one error message request a power level change exceeding a power change threshold,
wherein the power change threshold exceeds a maximum power level offset of the power level variation sequence.

10. The power transmitter of claim 1, wherein the generator circuit is arranged to introduce the power level variation sequence by applying a frequency offset variation sequence to a frequency of the power transfer signal.

11. The power transmitter of claim 1, wherein the generator circuit is arranged to adapt the power level variation sequence in response to a timing of the at least one error message.

12. The power transmitter of claim 1, wherein the generator circuit is arranged to adapt the power level variation sequence in response to power level variations requested by the at least one error message.

13. The power transmitter of claim 1, wherein the validity detector circuit is arranged to adapt a detection criterion for the comparison in response to power level variations requested by the at least one error message.

* * * * *